Dec. 19, 1939. W. H. BASELT 2,183,850
BRAKE ARRANGEMENT
Original Filed March 11, 1935
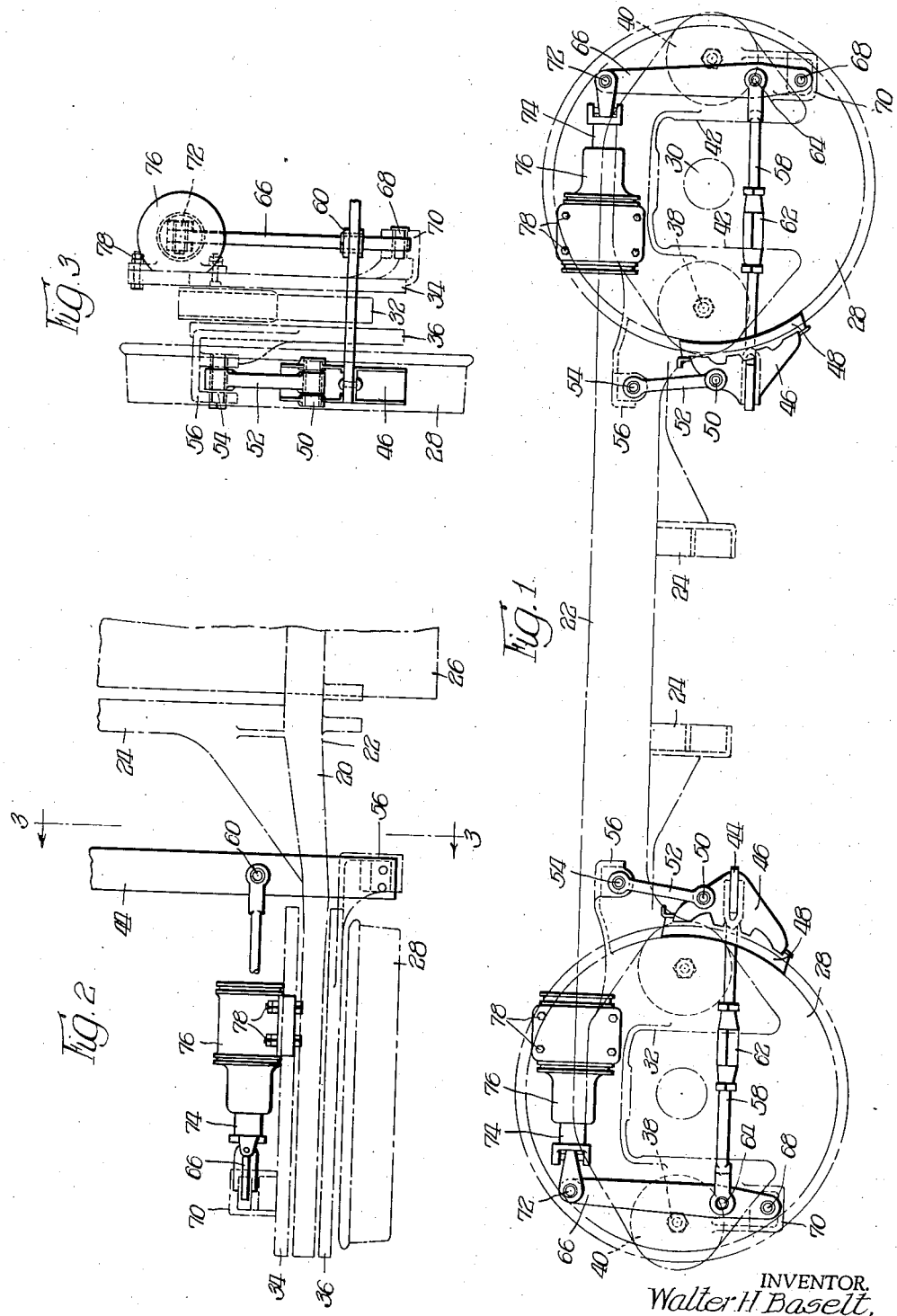
INVENTOR.
Walter H Baselt,
BY Wilkinson, Huxley, Byron & Knight
ATTORNEYS.

Patented Dec. 19, 1939

2,183,850

UNITED STATES PATENT OFFICE 2,183,850

BRAKE ARRANGEMENT

Walter H. Baselt, Chicago, Ill., assignor to American Steel Foundries, Chicago, Ill., a corporation of New Jersey Original application March 11, 1935, Serial No. 10,349. Divided and this application August 6, 1938, Serial No. 223,398

20 Claims. (Cl. 188—52)

This invention relates to railway car trucks, and more particularly to brake mechanism particularly adapted for the new type of light high speed cars, this application being a division of application Serial No. 10,349, filed March 11, 1935.

An object of the invention is to provide a truck and brake arrangement in which there is proper flexibility between various portions of the truck to permit of easy and uncramped operation thereof and of the brakes, and at the same time maintain sufficient rigidity to meet safe operating requirements.

Another object is to provide brake mechanism for such trucks which will have the necessary clearance for effective operation within a relatively small space.

Still another object is to provide a truck and brake combination particularly for the light high speed railway cars adapted to meet the various requirements for successful operation and service.

Other objects, features, capabilities and advantages are comprehended by the invention, as will later appear and as are inherently possessed thereby.

Referring to the drawing:

Figure 1 is a fragmentary view in side elevation of a railway car truck embodying the invention, it being understood that the car truck on the other side thereof is of the same construction as that shown;

Figure 2 is a fragmentary top plan view of the truck and brake construction shown in Figure 1 of the drawing; and Figure 3 is a fragmentary sectional view taken substantially in the plane as indicated by line 3—3 of Figure 2 of the drawing.

Referring now more in detail to the drawing, an embodiment selected to illustrate the present invention is shown as being attached to a truck which consists essentially of the truck frame 20 having spaced side frames 22 integrally connected by means of the spaced transoms 24 forming a bolster opening for the reception of the usual load carrying member or bolster 26. The truck illustrated is of the inboard type, the truck being supported by means of the spaced wheel and axle assemblies 28, the axles being generally indicated in side elevation as at 30.

The side frames are provided with the pedestal jaws 32 normally spaced from the journal means (not shown) having bearing cooperation with the wheel and axle assemblies. The side frames are provided with inner and outer wing castings 34 and 36 secured to the side frames adjacent the pedestals by means of the bolts 38, resilient means, such as rubber doughnuts or pads 40, being provided between the wing castings and the side frames to permit limited relative movement between said wing castings and side frames. The wing castings are provided with pedestal jaws 42 adapted to engage the journal means whereby relative movements are permitted between the wheel and axle assemblies and the truck frame through the wing castings and resilient pads.

Referring now more particularly to the brake arrangement and supporting structure therefor, the brake beam 44 is disposed adjacent the inner periphery of the wheel and axle assembly 28 and is provided adjacent the outer ends thereof with the brake heads 46 non-rotatably secured thereto, said brake heads 46 being provided with brake shoes 48 adapted to have braking cooperation with the inner periphery of the associated wheel. The brake heads are pivotally connected as at 50 to the hanger link 52, the upper end of said hanger link being pivotally connected as at 54 to the bracket 56 provided on the outer wing casting 36.

The pull rod 58 is pivotally connected as at 60 to the brake beam 44 inwardly of the side frame, the pull rod 58 being adjustable by means of the turnbuckle 62, the other end of said pull rod being pivotally connected as at 64 to the dead lever 66 intermediate the ends of said lever. The lever 66 is pivotally connected adjacent the lower end thereof as at 68 to the bracket 70 provided on the inner wing casting 34. The upper end of said dead lever 66 is pivotally connected as at 72 to the piston 74 of the operating cylinder 76, said operating cylinder being secured as at 78 to the inner wing casting 34.

As disclosed in the drawing, two cylinders are provided for operation of the brakes of each wheel and axle, one disposed on the inner wing casting at each side of the truck. In the operation of the brake mechanism, movement of the piston 74 in an outboard direction toward the adjacent end of the truck causes pivotal movement of the lever 66 about the pivot 68 whereby the pull rod 58 is caused to move the brake beam 44 to apply the brake shoe 48 to the periphery of the associated wheel of the adjacent wheel and axle assembly. Release movement occurs in an opposite direction upon retraction of the piston due to release of the brake fluid.

As far as the unit cylinder brakes are concerned, it is of course appreciated that outboard trucks may be used and/or trucks where no wing castings are utilized, in which case the brake cylinder and brake rigging will be directly carried by the side frame or truck frame, and it is to be further understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a wheel and axle assembly, a truck frame member supported by said wheel and axle assembly, a frame member yieldably supported with respect to said truck frame, a brake head pivotally and movably supported on one side of the axle and adjacent the wheel for braking cooperation therewith, a substantially vertically disposed dead lever on the other side of said axle pivotally connected adjacent its lower end to said frame member, a connection for operatively connecting said lever to said brake head, and brake operating means connected to said lever.

2. In a brake arrangement, the combination of a wheel and axle assembly, a truck frame member supported by said wheel and axle assembly, a brake head pivotally and movably supported on one side of the axle and adjacent the wheel for braking cooperation therewith, a substantially vertically disposed dead lever on the other side of said axle, a connection disposed below said axle for operatively connecting said lever to said brake head, and a brake cylinder having a piston operatively connected to said lever for operating the same.

3. In a brake arrangement, the combination of a wheel and axle assembly, a truck frame member supported by said wheel and axle assembly, a brake head pivotally and movably supported adjacent the wheel for braking cooperation therewith, a brake beam operatively connected to said brake head, a substantially vertically disposed dead lever connected to said brake beam, and a brake cylinder having a piston operatively connected to said lever and movable outwardly from said axle for operating said lever.

4. In a brake arrangement, the combination of a wheel and axle assembly, a truck frame member supported by said wheel and axle assembly, a brake head, means for pivotally and movably supporting said brake head adjacent the wheel for braking cooperation therewith, a brake beam movably supported by said means, a substantially vertically disposed dead lever connected to said brake beam, and a brake cylinder having a piston operatively connected to said lever and movable outwardly from said axle for operating said lever.

5. In a brake arrangement, the combination of a wheel and axle assembly, a truck frame member supported by said wheel and axle assembly, a frame member yieldably supported with respect to said truck frame, a brake head, means for pivotally and movably supporting said brake head on one side of the axle and adjacent the wheel for braking cooperation therewith, a brake beam movably supported by said means, a substantially vertically disposed dead lever disposed on the other side of said axle pivotally connected adjacent its lower end to said frame member, a connection between said lever intermediate its ends and said brake beam, and a brake cylinder having a piston connected to said lever adjacent its upper end for operating the same.

6. In a brake arrangement, the combination of a wheel and axle assembly, a truck frame member supported by said wheel and axle assembly, a brake head, means for pivotally and movably supporting said brake head on one side of the axle and adjacent the wheel for braking cooperation therewith, a brake beam movably supported by said means, a substantially vertically disposed dead lever disposed on the other side of said axle, a connection between said lever and said brake beam below the level of said axle, and a brake cylinder having a piston connected to said lever for operating the same.

7. In a car truck, a substantially rigid truck frame, a pair of wheeled axles, journal means on the axles for supporting the frame, resilient means interposed between the journal means and the truck frame for cushioning dynamic loads, and brake mechanism associated with the truck arranged so that substantially the entire braking action is directed against the car axles, said mechanism including a brake cylinder, a single brake beam for each axle, a dead lever member on the opposite side of each of the axles from said brake beam, means for moving said beam to operative position by said lever, said lever and brake cylinder being mounted on said journal means whereby the reaction from braking bypasses the resilient supporting means for the truck frame.

8. In a car truck, a substantially rigid truck frame including side frames having pedestal arms, a pair of wheeled axles, journals for supporting the truck frame on the axles, clamping plate means mounted on the journals adapted to receive the pedestal arms of the side frames and support the truck frame out of direct contact with the journal boxes, resilient means interposed between the plate means and the frame for cushioning relative movement, and braking mechanism associated with the truck, said mechanism including a brake cylinder and a dead lever mounted on said clamping plate means, and a single brake beam for each pair of wheels carried by said frame, said brake beam and lever being disposed on opposite sides of each of said axles.

9. In a brake arrangement, the combination of a wheel and axle assembly, a truck frame, inner and outer wing members cooperating with said wheel and axle assembly and yieldably connected to said truck frame, a brake head, means connected to one of said wing members for pivotally and movably supporting said brake head adjacent the wheel for braking cooperation therewith, a substantially vertically disposed dead lever connected to the other of said wing members operatively connected to said brake head, and a brake cylinder connected to said other of said wing members and having a piston connected to said lever for operating the same.

10. In a brake arrangement, the combination of a wheel and axle assembly, a truck frame, inner and outer wing members cooperating with said wheel and axle assembly and yieldably connected to said truck frame, a brake head, means connected to one of said wing members for pivotally and movably supporting said brake head adjacent the wheel for braking cooperation therewith, a brake beam movably supported by said means, a substantially vertically disposed dead lever connected to the other of said wing members, means connecting said lever and said brake beam, and a brake cylinder connected to said other of said wing members and having a piston connected to said lever for operating the same.

11. In a brake arrangement, the combination of a truck frame, a wheel and axle assembly disposed in supporting relation thereto, a vertically disposed dead lever pivoted adjacent the lower end thereof with respect to said truck frame and disposed on one side of the axle, a brake beam disposed on the opposite side of said axle, a brake head having a shoe adapted to have braking cooperation with said wheel, means for pivotally supporting said head and beam with respect to said frame, a pull rod pivotally connecting said dead lever intermediate the ends thereof to said beam and disposed below said axle, and an operating cylinder carried by said truck frame and having the piston thereof connected to said dead lever adjacent the upper end thereof.

12. In a brake arrangement, the combination of a side frame, a wheel and axle assembly disposed in supporting relation to said side frame, a brake head supporting member pivotally mounted at its upper end to said side frame on the inside periphery of said wheel, a brake head supported by said member and provided with a shoe adapted to have braking cooperation with said wheel, a brake beam supported by said member, a substantially vertically disposed dead cylinder lever pivotally supported adjacent the lower end thereof by said side frame, a connection between said dead cylinder lever and said brake beam, and a cylinder supported by said side frame and having a piston connected to said cylinder lever adjacent the upper end thereof.

13. In a brake arrangement, the combination of a side frame, a wheel and axle assembly disposed in supporting relation to said side frame, a brake head supporting member pivotally mounted at its upper end to said side frame on the inside periphery of said wheel, a brake head supported by said member and provided with a shoe adapted to have braking cooperation with said wheel, a brake beam supported by said member, a substantially vertically disposed dead cylinder lever pivotally supported adjacent the lower end thereof by said side frame below the axle, a connection between said dead cylinder lever and said brake beam below said axle, and a cylinder supported by said side frame and having a piston connected to said cylinder lever adjacent the upper end thereof and above said axle.

14. In a brake arrangement, the combination of a side frame, a wheel and axle assembly disposed in supporting relation to said side frame, a brake head supporting member pivotally mounted at its upper end to said side frame on the inside periphery of said wheel, a brake head supported by said member and provided with a shoe adapted to have braking cooperation with said wheel, a brake beam supported by said member, a substantially vertically disposed dead cylinder lever pivotally supported adjacent the lower end thereof by said side frame below said axle and on the opposite side thereof from said member, a connection between said dead cylinder lever and said brake beam below said axle, and a cylinder supported by said side frame and having a piston connected to said cylinder lever adjacent the upper end thereof and above said axle.

15. In a brake arrangement, the combination of a side frame, a wheel and axle assembly disposed in supporting relation to said side frame, a brake head supporting member pivotally mounted at its upper end to said side frame on the inside periphery of said wheel, a brake head supported by said member and provided with a shoe adapted to have braking cooperation with said wheel, a brake beam supported by said member, a substantially vertically disposed dead cylinder lever pivotally supported adjacent the lower end thereof by said side frame below said axle and on the opposite side thereof from said member, said cylinder lever being disposed inboard of said side frame, a connection between said dead cylinder lever and said brake beam below said axle, and a cylinder supported by said side frame and having a piston connected to said cylinder lever adjacent the upper end thereof and above said axle.

16. In a brake arrangement, the combination of a side frame, a wheel and axle assembly disposed in supporting relation to said side frame, a brake head supporting member pivotally mounted at its upper end to said side frame on the inside periphery of said wheel and outboard of said side frame, a brake head supported by said member and provided with a shoe adapted to have braking cooperation with said wheel, a brake beam supported by said member, a substantially vertically disposed dead cylinder lever pivotally supported adjacent the lower end thereof by said side frame, a connection between said dead cylinder lever and said brake beam, and a cylinder supported by said side frame and having a piston connected to said cylinder lever adjacent the upper end thereof.

17. In a brake arrangement, the combination of a truck frame, a wheel and axle assembly disposed in supporting relation thereto, a vertically disposed dead lever pivoted adjacent the lower end thereof with respect to said truck frame and disposed on one side of the axle, a brake beam disposed on the opposite side of said axle, a brake head carried by said beam and having a shoe fixed thereto and adapted to have braking cooperation with said wheel, a hanger pivotally supporting said head and beam with respect to said frame, a pull rod pivotally connecting said lever intermediate the ends thereof to said beam and disposed below said axle, and an operating cylinder carried by said truck frame and having the piston thereof connected to said lever adjacent the upper end thereof.

18. In a brake arrangement, the combination of a side frame, a wheel and axle assembly disposed in supporting relation to said side frame, a hanger supported at its upper end by said side frame on the inside periphery of said wheel and outboard of said side frame, a brake head supported by said hanger adjacent the lower end thereof and having a shoe adapted to have braking cooperation with said wheel, a brake beam secured to said head, a substantially vertically disposed dead cylinder lever pivotally supported adjacent the lower end thereof by said side frame, a connection between said dead cylinder lever and said brake beam, and a cylinder supported by said side frame and having a piston connected to said cylinder lever adjacent the upper end thereof.

19. In a brake arrangement, the combination of a side frame, a wheel and axle assembly disposed in supporting relation to said side frame, a hanger supported at its upper end by said side frame on the inside periphery of said wheel and outboard of said side frame, a brake head supported by said hanger adjacent the lower end thereof and having a shoe adapted to have braking cooperation with said wheel, a brake beam secured to said head, and a substantially vertically disposed dead cylinder lever pivotally supported adjacent the lower end thereof by said side frame below the axle and on the opposite side thereof from the hanger lever, a connection between said dead cylinder lever and said brake beam below said axle, and a cylinder supported by said side frame and having a piston connected to said cylinder lever adjacent the upper end thereof.

20. In a brake arrangement, the combination of a side frame, a wheel and axle assembly disposed in supporting relation to said side frame, a hanger supported at its upper end by said side frame on the inside periphery of said wheel and outboard of said side frame, a brake head supported by said hanger adjacent the lower end thereof and having a shoe adapted to have braking cooperation with said wheel, a brake beam secured to said head, and a substantially vertically disposed dead cylinder lever pivotally supported adjacent the lower end thereof by said side frame, a connection between said dead cylinder lever and said brake beam, and a cylinder supported by said frame and having a piston connected to said cylinder lever adjacent the upper end thereof.

WALTER H. BASELT.